J. J. CATRON.
AUXILIARY AIR VALVE FOR MOTORS.
APPLICATION FILED JUNE 2, 1921.
1,436,943.
Patented Nov. 28, 1922.
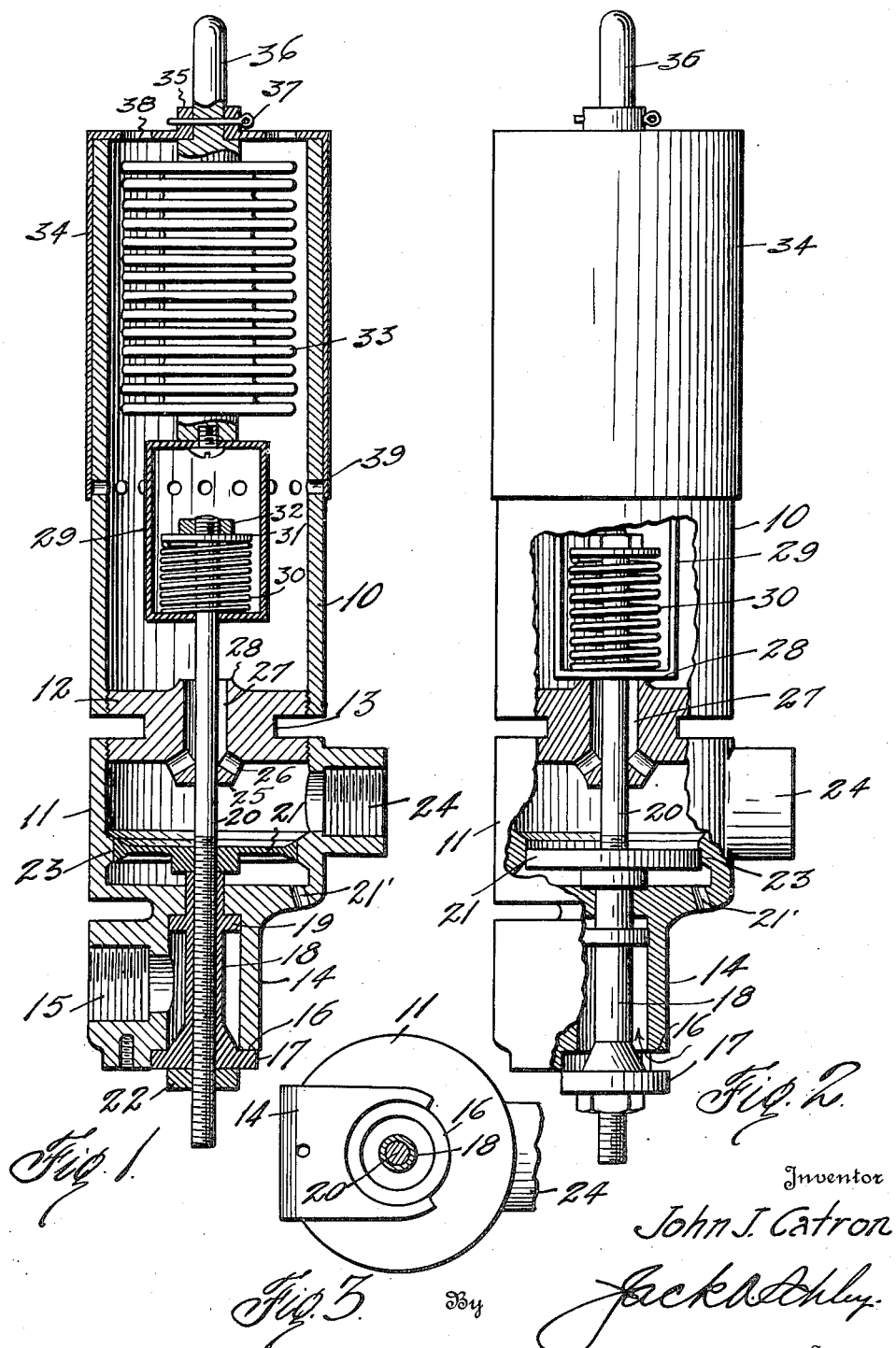
Inventor
John J. Catron
By Jack A. Ashley
Attorney Patented Nov. 28, 1922.

1,436,943

UNITED STATES PATENT OFFICE.

JOHN J. CATRON, OF BONHAM, TEXAS, ASSIGNOR TO CATRON MANUFACTURING COMPANY, OF BONHAM, TEXAS, A CORPORATION OF TEXAS.

AUXILIARY AIR VALVE FOR MOTORS.

Application filed June 2, 1921. Serial No. 474,322.

*To all whom it may concern:*

Be it known that I, JOHN J. CATRON, a citizen of the United States, residing at Bonham, in the county of Fannin and State of Texas, have invented certain new and useful Improvements in Auxiliary Air Valves for Motors, of which the following is a specification.

This invention relates to new and useful improvements in auxiliary air valves for motors.

The object of the invention is to provide an auxiliary air valve for internal combustion motors and adapted to be connected directly to the gas intake manifold so as to admit air directly into said manifold. Another object of the invention is to provide means for automatically operating the auxiliary valve whereby said valve will remain closed and exclude air from the manifold until the motor has warmed up to such a degree that the admission of air into the manifold will be advantageous. By this arrangement there can be no interference with the starting of the motor and the additional air will be supplied only under the most advantageous condition, thus resulting in a saving of fuel and a reduction in carbon deposits, as well as a smoother running motor.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a vertical sectional view of a device constructed in accordance with my invention and showing the air intake closed, Fig. 2 is a view of the same partially in elevation and partially in section and showing the air intake open, and Fig. 3 is an under side view of the same.

In the drawings the numeral 10 designates a cylindrical housing which is connected with a valve cylinder 11 by means of a coupling collar 12. The collar is divided into upper and lower flanges by a circumferential groove 13, said flanges being screwed into the adjacent ends of the housing and cylinder. The groove 13 aids in the dissipation of heat from the collar.

A valve casing 14 depends from the cylinder 11 and has a laterally extending outlet 15. The casing has an annular valve seat 16 at its lower end normally engaged by a valve head 17. The valve head is preferably, but not necessarily integral with a sleeve 18 having a collar 19 near its upper end and engaging the upper end of the valve casing when the valve is closed. The sleeve extends thru an aperture in the top of the casing and projects into the valve cylinder 11. A valve stem 20 has screw threads on which the valve sleeve and head are mounted. The sleeve engages the center of a disk valve 21 mounted on the threads in the cylinder 11. A lock nut 22 on the lower end of the stem engages the head 17.

The disk valve has a snug sliding fit in a faced annular boss 23 in the lower portion of the cylinder 11. The valve cylinder has a laterally extending collar 24, which is internally screw threaded to receive a pipe (not shown) thru which exhaust gases from the motor are conveyed. This inlet is located above the boss 23. The collar 12 has a valve stem guide 25 which is provided with ports 26 communicating with the bore 27 of said collar. At its upper end the bore is surmounted by an annular valve seat 28.

The stem 20 extends thru the guide 25 and bore 27 and enters a stirrup or hanger 29. A coiled spring 30 is mounted on the upper end of the stem within the hanger, said spring being confined between the bottom of the hanger and a washer 31, fastened on the upper end of the stem by a nut 32. The hanger is suspended from the lower end of a suitably constructed thermostat 33 mounted in the upper end of the housing. A port 21' is provided for relieving any pressure below the disk valve 21.

A jacket 34 fits snugly around the upper portion of the housing and has an upstanding central collar 35 thru which the post 36 of the thermostat passes. A cotter key 37 passing thru the collar and post fasten the parts together. Escape openings 38 are provided in the top of the jacket thru which the exhaust gases may pass. Should the said openings not provide an adequate escape, the jacket will be raised a short distance to uncover perforations 39 in the sides of the housing, whereby the pressure will be relieved and injury to the thermostat prevented.

The outlet 15 is suitably connected direct to the gas intake manifold of the motor. When the motor is not operating the parts will be in the position shown in Fig. 1. In this position the hanger 29 is elevated and the spring 30 compressed, whereby the valve 17 is seated and the passage of air thru the casing 14 to the manifold, is prevented. The ports 26 and bore 27 are open and exhaust gases entering the cylinder 11, may pass into the housing 10 and escape therefrom.

As the motor warms up the gases will become hotter and cause the thermostat to expand, whereby the hanger will be lowered. At the same time said gases will be exerting a downward pressure on the disk valve 21. The tension of the spring should be such as to resist the pressure of the gases on the valve 21, until the hanger has approached or rests upon the seat 28.

When the hanger rests on the seat 28, the motor will have warmed up to the point where air may be taken into the manifold, to an advantage. The pressure of the exhaust gases will force the valve 21 downward, thus unseating the valve 17 and admitting air to the casing 14 and permitting it to pass out thru the outlet 15 to the manifold. The hot gases will keep the entire device sufficiently hot to maintain the expansion of the thermostat.

It will be seen that as the hanger descends the resistance of the spring 30 to the downward pressure of the gases on the disk valve 21, will gradually decrease. The parts may be adjusted by manipulating the nut 32, so that the tension of the spring will be overcome by the pressure at a predetermined point. Thus after the motor has heated to a certain extent, the air valve 17 will be opened to admit a small quantity of air and as the motor becomes hot the air valve will be opened to admit a greater column of air. The valve head 17 is given a conical shape within the casing so as to increase the size of the air admitting opening as the said valve head is moved downwardly.

A device of this character will be quite sensitive and will modulate the mixture of air and gas in the manifold as needed by the motor to perform most efficiently. Its automatic operation is important as it precludes the uncertainty of manual operation and adjustment and obviates too rich as well as too lean a mixture of gas and air.

What I claim, is:

1. In an auxiliary air valve for motors, a normally closed valve for admitting air to the intake manifold of a motor, a chamber for receiving exhaust gases from a motor, a thermostat mounted in said chamber, a pressure valve connected with the air valve and subject to the pressure of said exhaust gases, and a connection between the pressure valve and the thermostat including a restraining element for resisting operation of the pressure valve until the thermostat has expanded to a predetermine degree.

2. In an auxiliary air valve for motors, a normally closed valve for admitting air to the intake manifold of a motor, a chamber for receiving exhaust gases from a motor, a thermostat mounted in said chamber, a pressure valve connected with the air valve and subject to the pressure of said exhaust gases, a connection between the pressure valve and the thermostat including a restraining element for resisting operation of the pressure valve until the thermostat has expanded to a predetermine degree, and means for timing the operation of the pressure valve and the opening of the air admitting valve.

3. In an auxiliary air valve, a valve casing having a seat and an outlet adapted to be connected to the intake manifold of a motor, a valve head normally engaging the seat, a thermostat chamber normally open to the exhaust gases, a thermostat disposed in the chamber, a connection between the valve head and the thermostat, a pressure valve carried by said connection between the valve head and the thermostat, and means for excluding exhaust gases from the chamber when the thermostat is expanded and the valve head unseated.

4. In an auxiliary air valve, a thermostat chamber, a valve chamber, a valve casing, the valve chamber having communication with the thermostat chamber, the valve casing having an air admitting valve seat and an air outlet, the latter for connection with the intake manifold of a motor, a valve head normally engaging the seat of the casing, a valve stem extending thru the valve chamber into the thermostat chamber, a pressure valve mounted on the stem in the valve chamber, said valve chamber having an inlet above the pressure valve for admitting exhaust gases which pass into the thermostat chamber, a thermostat mounted in the thermostat chamber, a connection between the thermostat and the valve stem, and means for maintaining the valve head in position to exclude air from entering the valve casing thru the valve seat until the thermostat has expanded.

5. In an auxiliary air valve, a thermostat chamber, a valve chamber, a valve casing, the valve chamber having communication with the thermostat chamber, the valve casing having an air admitting valve seat and an air outlet, the latter for connection with the intake manifold of a motor, a valve head normally engaging the seat of the casing, a valve stem extending thru the valve chamber into the thermostat chamber, a pressure valve mounted on the stem in the valve chamber, said valve chamber having an inlet above the pressure valve for admitting exhaust gases which pass into the thermostat chamber, a thermostat mounted in the thermostat chamber, a connection between the thermostat and the valve stem, means for maintaining the valve head in position to exclude air from entering the valve casing thru the valve seat until the thermostat has expanded, and means for cutting off the passage of exhaust gases from the valve chamber to the thermostat chamber when the thermostat has expanded to a predetermined point.

6. In an auxiliary air valve, the combination of a thermostat chamber, a valve chamber, a valve casing having an air admitting opening and an air discharge opening for connection with the intake manifold of a motor, a valve normally closing the air inlet of the casing, a valve stem extending thru the valve chamber and into the thermostat chamber, the valve chamber having an inlet for hot exhaust gases, a pressure valve mounted on the stem in the valve chamber, the valve chamber having communication with the thermostat chamber for the passage of exhaust gases thereinto, a thermostat located in the thermostat chamber, a connection between the thermostat and the valve stem, the thermostat chamber having gas escape openings, and an element normally closing said escape openings and connected for operation by an excessive pressure of exhaust gases in the thermostat chamber to uncover said escape openings.

7. In an auxiliary air valve, the combination of an air admitting and discharging valve casing, a valve for closing the air admitting opening of the casing, a stem connected with the air valve, a pressure valve mounted on the stem, a thermostat, a connection extending from the thermostat and receiving the valve stem, and a tension device confined on the valve stem between the connection and the ends of said stem acting to normally hold the air valve closed and to resist the operation of the pressure valve.

In testimony whereof I affix my signature.

JOHN J. CATRON.